United States Patent Office 3,597,445
Patented Aug. 3, 1971

3,597,445
1H-ISOINDOLE INTERMEDIATES
William J. Houlihan, Mountain Lakes, and Marcel K. Eberle, Madison, N.J., assignors to Sandoz-Wander, Inc., Hanover, N.J.
No Drawing. Filed June 19, 1968, Ser. No. 738,121
Int. Cl. C07d 27/36
U.S. Cl. 260—326.1                   2 Claims

ABSTRACT OF THE DISCLOSURE

Process for preparing 5-hydroxy-5-aryl-2,3-dihydro-5H-imidazo[2,1-a]isoindoles, e.g., 5-(p-chlorophenyl)-5-hydroxy-2,3-dihydro-5H-imidazo[2,1-a]isoindole. An appropriately substituted 3-aryl phthalimidine is treated with triethyloxonium borontetrafluoride to provide an intermediate 3-ethoxy-1H-isoindole which is converted to the final product by treatment with ethyleneimine hydrotetrafluoroborate and contacting the resulting product with air or oxygen. These compounds are useful as psychic energizers and anorectics.

This invention relates to a process for preparing tricyclic compounds. In particular, the invention pertains to a process for the preparation of 5-hydroxy-5-aryl-2,3-dihydro-5H-imidazo[2,1-a]isoindoles, and intermediates for said isoindoles.

The imidazo[2,1-a]isoindoles with which the present invention is concerned may be represented structurally as follows.

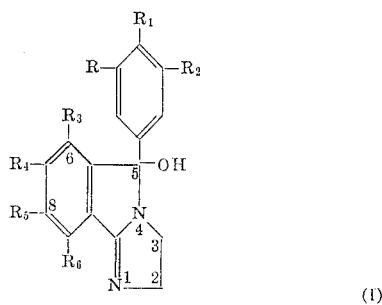

(I)

wherein each of R, $R_1$, $R_2$, $R_3$, $R_4$ and $R_5$ is, independently, hydrogen, chloro or fluoro, and $R_6$ is hydrogen or fluoro; provided that not more than two of $R_3$, $R_4$, $R_5$ and $R_6$ are other than hydrogen, and not more than three of R, $R_1$, $R_2$, $R_3$, $R_4$, $R_5$ and $R_6$ are other than hydrogen.

The preferred aspect of this invention is that which provides compounds of Formula I wherein either or both of R and $R_1$ are chloro and the remaining substituents are hydrogen, namely 5-(p-chlorophenyl)-5-hydroxy-2,3-dihydro-5H-imidazo[2,1-a]isoindole, 5-(m - chlorophenyl)-5-hydroxy-2,3-dihydro-5H-imidazo[2,1-a]isoindole and 5-(3,4 - dichlorophenyl)-5-hydroxy - 2,3 - dihydro-5H-imidazo[2,1-a]isoindole.

The above compounds (I) are prepared according to this invention by converting an appropriate phthalimidine to corresponding 3-ethoxy-1H-isoindoles (II) and converting the latter to the compounds of Formula I by treatment with ethyleneimine hydrotetrafluoroborate. Said 3-ethoxy-1H-isoindoles (II) are novel and are a further aspect of this invention.

The process for converting said isoindoles (II) to the final products (I) may be represented as follows.

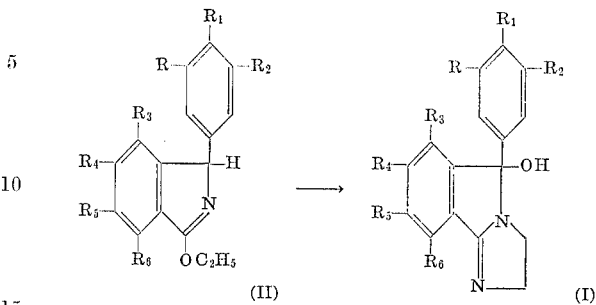

The isoindoles (II) are converted to the compounds of Formula I by a procedure involving treatment with ethyleneimine hydrotetrafluoroborate (known compound) to provide an intermediate reaction product (III). This step is conducted in inert solvent and inert atmosphere, e.g., nitrogen gas, at a temperature of about 20–100° C., conveniently at reflux temperature, for about 1 to 8 hours. The solvent which may be used includes aromatic hydrocarbons such as benzene, toluene, xylene and the like.

The intermediate reaction product (III) may then be treated with air or oxygen for 2 to 10 days to obtain the compounds (I). However, it is generally more desirable to accelerate the reaction and this can be readily accomplished by bubbling air or oxygen at room temperature into a solution of intermediate product (III) in solvent, preferably loweralkanol, e.g., methanol or ethanol. In this manner, appreciable yields of the desired product (I) are obtained within about 4 hours. The resulting compounds of Formula I may be recovered using conventional techniques.

Although not known with certainty, it is believed that the intermediate reaction products formed after the fluoroborate and 1H-isoindole are contacted and before the oxidation in air or oxygen may be of the formula

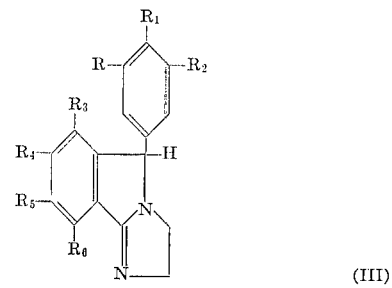

(III)

where R through $R_6$ are as previously defined.

The isoindoles (II) are prepared from a corresponding phthalimidine (IV)

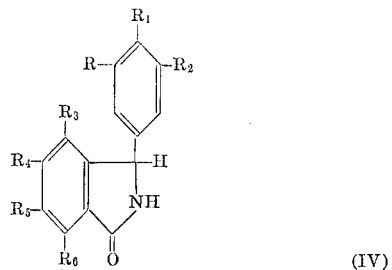

(IV)

by treatment with triethyloxonium borontetrafluoride in solvent such as chlorinated hydrocarbons, e.g., methylene chloride, conveniently at about room temperature for about 2–16 hours. The insoindole (II) is then recovered using conventional techniques.

Various of the starting compounds (IV) are known and they are readily prepared according to methods disclosed in the literature. Such other phthalimidines (IV) which are not specifically disclosed may be prepared by an analogous methods from known materials.

The compounds of Formula I are useful because they possess pharmacological activity in animals. In particular, the compounds possess appetite depressant activity as indicated by their activity in rat given 12.5–50 mg./kg. of active agent and tested by use of the free-feeding method described by Randall, et al. (J.P.E.T., 129, 163, 1960) whereby 16 groups of six male Wistar rats are deprived of food for 18 hours but receive water ad libitum. Consumption of ground food is then measured over a four hour period following oral administration of the agent tested. Accordingly, such compounds may be used as anorexigenic agents. The compounds of Formula I also possess central nervous system stimulant activity and can be used as psychic energizers as indicated by their activity in mouse given 12.5–25 mg./kg. of active compound and tested by use of a 30 word adjective check sheet method basically as described by Irwin, S. (Gordon Research Conference, Medicinal Chemistry, 1959), and Chen (Symposium on Sedative and Hypnotic Drugs, William and Wilkins, 1954).

For such uses, the compounds may be combined with a pharmaceutically acceptable carrier, and such other adjuvants as may be necessary, and administered orally in such forms as tablets, capsules, elixirs, suspensions and the like or parenterally in the form of an injectable solution or suspension. Furthermore, the compounds may be similarly administered in the form of their non-toxic pharmaceutically acceptable acid addition salts. Such salts possess the same order of activity as the free base and are readily prepared in a conventional manner.

For the above-mentioned uses, the dosage administered will, of course, vary depending upon the compound employed, the mode of administration and treatment desired. However, in general, satisfactory results are obtained for each of the above-mentioned uses when the active compounds are administered at a daily dosage of from about .02 milligram to about 25 milligrams per kilogram of animal body weight, preferably given in divided doses, 2 to 4 times a day, or in sustained release form. For most primates the daily dosage is generally in the range of from about 1 milligram to about 75 milligrams, and dosage forms suitable for internal administration comprise from about 0.25 milligram to about 37.5 milligrams of the compound admixed with a solid or liquid pharmaceutical carrier or diluent.

Representative formulations are tablets (prepared by standard tabletting techniques) and containing the following ingredients.

| Ingredient: | Quantity (mg.) | |
|---|---|---|
| 5-(p-chlorophenyl) - 5 - hydroxy-2,3-dihydro-5H-imidazo[2,1-a]isoindole | 1 | 25 |
| Polyvinylpyrrolidone | 3.5 | 6 |
| Lactose | 40 | 90 |
| Calcium sulfate | 16.5 | 68 |
| Corn starch | 8 | 18 |
| Talc | 5 | 10 |
| Magnesium stearate | 1.0 | 3 |
| | 75 | 220 |

The following example is provided for the purpose of illustration and not by way of limitation. It is not intended so as to limit the scope of the invention as defined in the appended claims.

EXAMPLE 5-(p-chlorophenyl)-5-hydroxy-2,3-dihydro-5H-imidazo[2,1-a]isoindole

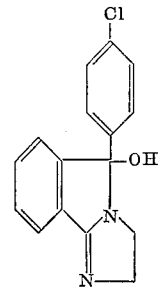

Step 1: 1 - (p-chlorophenyl)-3-ethoxy-1H-isoindole.—Crystalline triethyloxonium borontetrafluoride (21 g.) (prepared from 23 g. of borontrifluoride etherate and 11 g. of epichlorohydrin) is dissolved in 100 ml. of absolute methylenechloride. 3-(p-chlorophenyl) phthalimidine (21 g.) is added and the reaction mixture is stirred overnight at room temperature. The resulting solution is poured onto 50 ml. of saturated sodium carbonate, extracted with 500 ml. of ether and dried. Upon evaporation of the solvent there is obtained crude material which is recrystallized from methylenechloride/hexane (1:1) to yield 1-(p-chlorophenyl)-3-ethoxy-1H-isoindole; M.P. 102–103° C.

Step 2: 5-(p-chlorophenyl)-5-hydroxy-2,3-dihydro-5H-imidazo[2,1-a]isoindole.—1-(p-chlorophenyl) - 3 - ethoxy-1H-isoindole (1 g.), 2 g. of ethyleneimine hydrotetrafluoroborate moistened with methylenechloride (containing approximately 0.66 g. of dry salt) is refluxed in 25 ml. of absolute toluene for 2 hours in an atmosphere of nitrogen. The resulting mixture is poured into 2 N sodium carbonate solution (25 ml.) and extracted with ether. The ether solution is contacted with air for 6 days at room temperature to give the desired product. The crude material is recrystallized from acetone/hexane (1:1) to give 5 - (p-chlorophenyl)-5-hydroxy - 2,3 - dihydro-5H-imidazo[2,1-a]isoindole; M.P. 198–199° C.

When the above procedure is carried out and the following starting materials are used in place of 3-(p-chlorophenyl)phthalimidine, the indicated products are obtained.

| Starting material | Product |
|---|---|
| 1. 3-phenyl phthalimidine | 5-hydroxy-5-phenyl-2,3-dihydro-5H-imidazo[2,1-a]isoindole (M.P. 197°–199° C.). |
| 2. 3-(p-fluorophenyl) phthalimidine | 5-(p-fluorophenyl)-5-hydroxy-2,3-dihydro-5H-imidazo[2,1-a] isoindole (M.P. 198°–199° C.). |
| 3. 3-(3,4-dichlorophenyl) phthalimidine | 5-(3,4-dichlorophenyl)-5-hydroxy-2,3-dihydro-5H-imidazo[2,1-a]isoindole (M.P. 200°–201° C.). |
| 4. 3-(m-chlorophenyl) phthalimidine | 5-(m-chlorophenyl)-5-hydroxy-2,3-dihydro-5H-imidazo[2,1-a]isoindole (M.P. 208°–210° C.). |
| 5. 4-chloro-3-phenyl phthalimidine | 6-chloro-5-dyhroxy-5-phenyl-2,3-dihydro-5H-imidzao[2,1-a]isoindole (M.P. 224°–226° C.). |
| 6. 3-(m-fluorophenyl) phthalimidine | 5-(m-flourophenyl)-5-hydroxy-2,3-dihydro-5H-imidazo[2,1-a]isoindole (M.P. 200°–203° C.). |
| 7. 3-(3,5-dichlorophenyl) phthalimidine | 5-(3,5-dichlorophenyl)-5-hydroxy, 2,3-dihydro-5H-imidazo[2,1-a] isoindole (M.P. 207°–209° C.). |
| 8. 5,6-dichloro-3-phenyl phthalimidine | 7,8-dichloro-5-hydroxy-5-phenyl-2,3-dihydro-5H-imidazo[2,1-a]isoindole (M.P. 195°–198° C.). |
| 9. 5,6-dichloro-3(p-chlorophenyl) phthalimidine | 5-(p-chlorophenyl)-7,8-dichloro-5-hydroxy-2,3-dihydro-5H-imidazo[2,1-a]isoindole (M.P. 185°–190° C.). |
| 10. 6-chloro-5-phenyl phthalimidine | 8-chloro-5-hydroxy-5-phenyl-2,3-dihydro-5H-imidazo[2,1-a]isoindole (M.P. >10°–210° C.). |
| 11. 5-chloro-3-phenyl phthalimidine | 7-chloro-5-hydroxy-5-phenyl-2,3-dihydro-5H-imidazo[2,1-a]isoindole (M.P. 197°–202° C.). |
| 12. 5-fluoro-3-phenyl phthalimidine | 7-fluoro-5-hydroxy-5-phenyl-2,3-dihydro-5H-imidazo[2,1-a]isoindole (M.P. 206°–208° C.). |

What is claimed is:
1. A compound of the formula

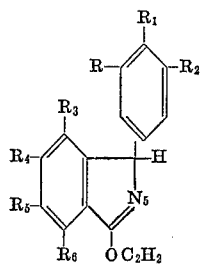

where each of R, $R_1$, $R_2$, $R_3$, $R_4$ and $R_5$ is, independently, hydrogen, chloro or fluoro, and $R_6$ is hydrogen or fluoro; provided that not more than two of $R_3$, $R_4$, $R_5$ and $R_6$ are other than hydrogen, and not more than three of R, $R_1$, $R_2$, $R_3$, $R_4$, $R_5$ and $R_6$ are other than hydrogen.

2. The compound of claim 1 which is 1-(p-chlorophenyl)-3-ethoxy-1H-isoindole.

References Cited

UNITED STATES PATENTS 2,701,252   2/1955   Vollmann et al. _____ 260—325

ALEX MAZEL, Primary Examiner

J. A. NARCAVAGE, Assistant Examiner

U.S. Cl. X.R.

260—309.6, 325; 424—273, 274